United States Patent
Buzza (10) Patent No.: US 11,941,475 B2
(45) Date of Patent: Mar. 26, 2024

(54) ELECTRONIC PEEK DEVICE WITH INTEGRATED VIBRATOR

(71) Applicant: Nathan Buzza, City Beach (AU)

(72) Inventor: Nathan Buzza, City Beach (AU)

( * ) Notice: Subject to any disclaimer, the term of this patent is extended or adjusted under 35 U.S.C. 154(b) by 274 days.

(21) Appl. No.: 17/412,315

(22) Filed: Aug. 26, 2021

(65) Prior Publication Data

US 2023/0063812 A1    Mar. 2, 2023

(51) Int. Cl.
*G06K 7/10* (2006.01)
*G06F 3/01* (2006.01)

(52) U.S. Cl.
CPC ......... *G06K 7/10297* (2013.01); *G06F 3/016* (2013.01); *G06K 7/10386* (2013.01); *G06K 2007/10524* (2013.01)

(58) Field of Classification Search
CPC .............. G06F 3/016; G06K 7/10297; G06K 7/10386; G06K 2007/1052
See application file for complete search history.

(56) References Cited

U.S. PATENT DOCUMENTS

| | | | | |
|---|---|---|---|---|
| 11,082,573 B1 * | 8/2021 | Filicetti | .................. | G06T 5/009 |
| 2019/0366197 A1 * | 12/2019 | Buzza | ....................... | A63F 1/18 |

OTHER PUBLICATIONS

"Electronic Peek Device—Magicians & Mentalists" by Illuminati Magic. YouTube—Broadcast Yourself. [dated Mar. 1, 2021], [online], [retrieved on Aug. 24, 2023]. <URL:https://www.youtube.com/watch?v=N6il9Uf4MfA>. 2 Pages. (Year: 2021).*
"Magic Review—Notifier 2 by Illuminati Magic". YouTube—Broadcast Yourself. [dated Mar. 24, 2021], [online], [retrieved on Aug. 24, 2023]. <URL:https://www.youtube.com/watch?v=XKU39S0kr00>. 2 Pages. (Year: 2021).*
"Unifi Notifier User Guide Version 1.00 by Illuminati Magic". Copyright 2019. 33 Pages. (Year: 2019).*
"ThoughtCast—ThoughtCast Magic". [dated Aug. 1, 2021], [online], [retrieved on Aug. 24, 2023]. <URL:https://web.archive.org/web/20210801041158/https://www.thoughtcastmagic.com/thoughtcast>. 10 Pages. (Year: 2021).*
"PeekSmith—The Device". [dated Jun. 24, 2021], [online], [retrieved on Aug. 24, 2023]. <URL:https://web.archive.org/web/20210624033629/https://peeksmith.info/the-device>. 3 Pages. (Year: 2021).*

(Continued)

*Primary Examiner* — Milap Shah (57) ABSTRACT

A novel, miniaturized hand-held electronic peek device that is used to display real-time information to the magician/performer for entertainment purposes by consolidating information from all the electronic magic devices from multiple vendors to a single platform; wherein the device includes Bluetooth radio transceiver, a radio receiver, a high-resolution colour LCD, vibrator motor and charging port. These components are configured to receive radio signals from a myriad of electronic magic props items such as electronic dice, dominoes, poker chips, pens, crayons, cubes, motion sensors, movement sensors, magnet detectors and RFID/NFC Readers. The information that is communicated from electronic devices is communicated to the magician/performer through visual and haptic feedback.

13 Claims, 5 Drawing Sheets

(56) References Cited

OTHER PUBLICATIONS

"Brand New Electronic Peek Device" Forum Post on TheMagicCafe. com. p. 1 of Thread. [first message dated Mar. 8, 2021], [online], [retrieved on Aug. 24, 2023]. <URL:https://www.themagiccafe.com/forums/viewtopic.php?topic=727586&start=0>. 7 Pages. (Year: 2021).*

"Brand New Electronic Peek Device" Forum Post on TheMagicCafe. com. p. 2 of Thread. [first message dated Mar. 8, 2021], [online], [retrieved on Aug. 24, 2023]. <URL:https://www.themagiccafe.com/forums/viewtopic.php?topic=727586&start=20>. 7 Pages. (Year: 2021).*

"Brand New Electronic Peek Device" Forum Post on TheMagicCafe. com. p. 3 of Thread. [first message dated Mar. 8, 2021], [online], [retrieved on Aug. 24, 2023]. <URL:https://www.themagiccafe.com/forums/viewtopic.php?topic=727586&start=40>. 5 Pages. (Year: 2021).*

* cited by examiner

ELECTRONIC PEEK DEVICE WITH INTEGRATED VIBRATOR

FIELD OF INVENTION

The present invention relates to a hand-held device, and more specifically, relates to a hand-held electronic peek device that enables magicians to obtain information from a myriad of devices in real-time and display it for the magician.

BACKGROUND

Magicians and Mentalists entertain spectators by simulating forms of Extra Sensory Perception (ESP), such as psychokinesis, clairvoyance, psychoscopy, precognition, telesthesia and telepathy. Though ESP has been discredited as factual science, spectators are still fascinated and entertained by the possibility that ESP exists.

Simulating ESP is a technically challenging field, as it requires discreetly (miniaturized) concealed electronics that are hidden inside everyday objects and a method of communicating information obtained from these devices during performance, without spectators being aware of the communication method. This is further complicated, that often this information is obtained from multiple different sources—obtained simultaneously and detailed in nature, requiring a communication device that is discreet, able to store and decode a volume of information and work with a variety of vendors.

Technology advancement has been taking place for the last several years that includes scanning devices with cameras, wearable devices to recognize playing cards, electronic card reading systems, automatic detection, dice and cards prediction devices, etc. Furthermore, there are numerous inventions that discuss dice recognition and methods thereof in online gaming and poker at casinos. For example, U.S. Ser. No. 10/828,556B2 is a device for the recognition of dice orientation. This invention describes a device that can instantly read the numbers on the dice as the dice are thrown onto a real-time scanner, such as a real-time flatbed scanner. The device also comprises a processor configured for receiving scanning information regarding the image of the scanning surface upon which a die or dice are thrown and programmed for deriving, based on the image, data regarding the dice thrown. The device comprises a flatbed scanning device having a scanning surface, the scanning surface being capable of throwing a dice or dice thereon, the flatbed scanning device being capable of instantaneously scanning an image on a scanning surface, and a processor configured to receive scanning information regarding an image on the scanning surface onto which the dice or dice are thrown, and programmed to extract data concerning the thrown dice from said image.

Another example talks about a method of dice eye number determination system. U.S. Pat. No. 7,360,762B2 describes the use of an image capturing area to register an image of a thrown dice. The image capturing device consists of either a camera located above the throwing area or a scanning device located under a transparent board. According to the method, the image signal is generated by capturing an image of one face on the die and the determination on whether or not the number of the eyes described on the image captured face is only one in the first place, and thereafter determination on the eye number corresponding to the other number is made.

In another example, US 20130150136 describes an electronic game system. Moreover, it is a scanning game input mechanism that includes a Light-emitting mechanism that defines multiple input regions for a game in which there are multiple players. A scanning mechanism scans objects placed within the input regions, while a communication mechanism communicates information regarding the scanned object. The information might, for example, be communicated to affect an electronic game state maintained in another device or distributed across multiple devices.

There are inventions that discuss the use of a radio transmitter and receiver in a dice scanning and display device. Such as, DE 102004046835 describes a display conversion and processing of an event like rolling a dice and give an output using the processor. The detection unit thus detects the random result supplied by at least one analog random generator and, in addition, via the detection of the objects, also a current state of the experimental arrangement. This recorded analog random result is digitized in the recognition unit, evaluated with regard to its meaning and thus recognized and assigned a certain value. This value is now available in a digitized form and can be processed further. The sensitive pad on the detection unit has a sensor matrix of essentially identical and regularly arranged individual sensors.

In addition to above mentioned prior art, there are inventions which present the system and device for reading cards in a deck of cards using Infrared system to be used by magicians. Relating to that US 20190366197 is an invention about an electronic card reading device and system for recognizing the sequence of every card in a stack of playing cards by scanning a unique Infrared bar code which is inscribed on each playing card. The device provides an electronic card reading device and system that assists performers/magicians in performing multiple and variable tricks using playing cards where playing cards are encoded with a simple code on the one hand, and inexpensive card reading devices are used on the other hand. The code inscribed on the cards can be easily read with great reliability by means of inexpensive equipment. The system includes one or more Infrared (also abbreviated as IR) sensitive cameras positioned to scan and read uniquely encoded information printed on the playing cards and transmit this encoded information to a processor. The encoded information contains various characteristics of the playing cards. This electronic card reading system is also able to identify the orientation, direction and colour of the playing cards, and this can be done from a remote location.

However, current inventions use only a vibrator function and only support proprietary devices (i.e., only function with a single vendor or a single electronic device), which significantly limits the depth of information that may be communicated to the performer. The current solutions available only receive events from electronic devices and do not support internet connectivity. A secondary and substantial issue is that there is a multitude of vendors of electronics items within the magic community, which do not provide any level of interoperability.

Therefore, to overcome the issues described above, advancement in technology is needed to make improvements in the field of mentalism and magic to provide it more realistic and believable. Therefore there exists a need for a system, device and platform that may eliminate the need to carry multiple devices of different vendors during the performance. Also, there exists a need of a device that may work as a visual receiver that nay discreetly communicate information to the magician or mentalist which is obtained from the electronic devices through both visual and haptic feedback. Moreover, there exists a need for a universal, miniaturized, hand-held electronic peek device that is capable to detect and communicate dice orientations, read playing cards, detect dominoes orientation, detect/communicate poker chip colour or orientation, pen selection, and a myriad of other information obtained from magic API installed within the smart user devices.

SUMMARY OF THE INVENTION

This summary has been provided to introduce a selection of concepts in a simplified form that are further disclosed in the detailed description of the invention. This summary is not intended to identify key or essential inventive concepts of the claimed subject matter, nor is it intended for determining the scope of the claimed subject matter.

The present invention satisfies the needs and alleviates the problem discussed above by providing a miniaturized hand-held device to work as a notifier for the magicians during their tricks. The purpose of the present invention is to have a visual receiver that may consolidate all the electronic magic devices from multiple vendors to a single platform, thus eliminating the need for separate electronic receivers for different electronic magic devices or trick objects such as electronic dice, dominoes, poker chips, pens, crayons, and other myriad of props embedded with RFID/NFC.

According to one embodiment, the miniaturized electronic hand-held device is provided by present invention for magicians and mentalists to entertain spectators through simulating some form of extrasensory perception (ESP). Though it is generally accepted by the scientific community that ESP has been discredited as factual science, spectators are still fascinated and entertained by the possibility that ESP exists.

According to one embodiment, the present invention is a universal hand-held electronic peek device that transcodes information from multiple electronic and software props into a single device that is suitable to be concealed by a performer while performing the act. The hand-held electronic peek device of present invention is capable of being used to discreetly communicate information to a magician and/or mentalist that has been obtained from a myriad of electronic devices or props through both visual and haptic feedback.

The present invention incorporates multiple radio receivers into a single, miniaturized platform that receives radio signals from various electronic items such as electronic dice, dominoes, poker chips, pens, crayons, motion sensors, movement sensors, magnet detectors, impression pads and RFID/NFC Readers and communicates information with the magician or the mentalist by displaying over display or by vibrating the hand-held electronic peak device.

According to one embodiment, the present invention is a universal electronic peek device that incorporates a high resolution, color liquid crystal display and a haptic vibrator motor that enables magicians to obtain information from a myriad of electronic devices including, but not limited to, electronic dice, dominoes, poker chips, pens, crayons, motion sensors, movement sensors, magnet detectors, impression pads and RFID/NFC Readers. According to one embodiment, the miniaturized electronic hand-held peak device of present invention communicates the received information from the myriad of electronic devices through a combination of said visual display and the haptic vibrator motor to enable performer to receive the information discretely so that they may offer a convincing performance of their powers of ESP.

According to one embodiment, the present invention includes a Bluetooth Radio Transceiver, a radio receiver, a high-resolution color LCD, vibrator motor and charging port, which is configured to receive radio signals from a myriad of electronic magic props items.

The present invention further describes a Notifier device that obtains information from spectators, which are entered on simulated search engines, calculators, e-commerce sites and other software platform to obtain information about a spectator. This information is displayed as messages on. Notifier.

The present invention further describes a device that can discreetly communicate information to a magician/mentalist that has been obtained from an electronic device through both visual and haptic feedback.

The present invention further provides a device that can intelligently consolidate and present the information to the performer to streamline the performance.

BRIEF DESCRIPTION OF THE DRAWINGS

The foregoing and other objects, features, and advantages of the devices and systems described herein will be apparent from the following description of particular embodiments thereof, as illustrated in the accompanying figures.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without departing from the scope of the disclosure.

According to one embodiment, the present disclosure relates to a hand-held electronic device. The present invention is a miniaturized hand-held electronic peek device ("Notifier") which is provided to monitor and record data from a plurality of various magic trick devices, i.e. electronic RFID embedded play cards, electronic dice, dominoes, poker chips etc. that may communicate detailed information to a magician to simulate some form of extrasensory perception (ESP) to entertain the spectators.

According to one embodiment, the hand-held electronic device of present invention is a universal handheld electronic device capable of being attached to any part of the body or within the clothes of the magician to connect and communicate with a myriad of different electronic props from various vendors to help simulate extrasensory perception or in simple words to show a trick which may feel like magic to the spectators. According to one embodiment, the universal hand-held electronic peek device is comprising of a main body enclosing an electronic unit which is further embedded with a Bluetooth receiver and a radio receiver which is configured to receive data from the myriad of other electronic based props or any other prop with hidden monitoring and communication device.

According to one embodiment, the universal hand-held electronic peek device of present invention further includes a high-resolution LCD display which is configured to provide and display the detailed information which is received from the myriad of coupled magic props and objects to the performer in real-time, which may help the magician to emulate extrasensory perception.

According to present embodiment, the LCD display of present invention is further provided to display the received information from the myriad of different electronic devices such as electronic dice, dominoes, poker chips, pens, crayons, motion sensors, movement sensors, magnet detectors, impression pads and RFID/NFC Readers, where each device may provide a multitude of information such as, but not limited to, orientation, movement, colour, velocity, magnetic field presence, programmed tag information and denomination etc. using which the magician may divine information such as the device the spectator has selected, real-time location of said device, how long ago said spectator chose the device and the order of selection of said device by said spectator etc. Using said collected information displayed over the LCD display of the hand-held electronic peek device combining with the classic mentalism techniques and performance, the performer may appear to have pre-ordinated certain events and outcomes and emulate "mind reading".

According to present embodiment, the display is a high-resolution dot-matrix display. According to one embodiment, the hand-held electronic peek device of present invention further includes a vibration motor configured within the miniaturized main body of the device that along with the display unit, communicates the selected orientation, selected colour, polarity, card value and card suit etc. using vibration. The combination of the vibration motor and the high-resolution display enables detailed information to be communicated to the performer in real-time.

According to one embodiment, the miniaturized body of present device is provided for magicians or users to conceal said device in numerous discreet locations. Further, the plurality of radio transceivers configured within the electronic unit of present hand-held electronic peek device is provided to receive information from a myriad of electronic devices, where the myriad of electronic device are the props used during magic performances by the magician such as but not limited to, electronic dice with an inbuilt radio transmitter, electronic dominoes with an inbuilt radio transmitter, electronic poker chips with an inbuilt radio transmitter, electronic pens with an inbuilt radio transmitter, electronic crayon box holder, electronic Rubik cubes, RFID/NFC readers including both external and on-board smartphone based NFC readers, magnetic field sensors and electronic impression pads etc.

According to one embodiment, the hand-held electronic peek device of present invention is capable to communicate and display and/or notify through vibration, the order of playing cards from a shuffled deck through the use of an external IR camera communicatively coupled with the electronic unit of the hand-held electronic peek device of present invention, display any missing card from the deck of playing card by reading the RFID or NFC tags embedded within or at the corners of each card within the deck, displaying the card newly inserted into a deck of the cards, and zanalyze the metrics of a cut deck (i.e. number of cards, number of cards of a nominated suit etc.).

According to one embodiment, the hand-held electronic peek device of present invention further includes a control unit communicatively coupled with all the myriad of external devices through the plurality of radio transmitters to receive the real-time data from said devices and communicate said data to the magician or user using the display unit and by vibrating the hand-held electronic peek device using the vibration motor. According to one embodiment, the control unit further controls the vibration of the vibration motor based on the pre-set algorithm within the control unit to avoid continuous vibration of the electronic peek device as a result of movement of the connected electronic devices.

According to one embodiment, the control unit of present hand-held electronic peek device incorporates a pre-defined stability time using which the control unit controls the vibration of the vibration motor. According to one embodiment, the control unit commences the vibration sequence only if the connected small device stays in a consistent orientation for a specified time. For instance, during any trick being performed by the magician, the device used in the trick being performed changes state such as a dice, which constantly changes its orientation when being handled to multiple audience members and may cause vibration in the hand-held device continuously, thus, the control unit avoids continues vibration using the "Stability time". For example, if the user specifies that the device must be stable for 5 seconds, then as the device is being handed to spectators, it will not generate notifications until the device remains in the same position for 5 seconds.

According to one embodiment, the hand-held electronic peek device of present invention further includes an internal JR camera embedded within the main body of the electronic peek device or a plurality of external cameras configured at various locations and communicatively coupled to the control unit of the electronic peek device to transmit the real-time recorded data to be displayed over the display unit. According to one embodiment, the electronic peek device of the present invention further includes plurality of various other detectors and sensors configured within the electronic unit of the device, such as an on-board magnetic field detector/sensor to detect the hidden magnets, and on-board an NFC or RFID reader to read the NFC and RFID tags embedded within other myriad of electronic devices and to decode and communicate the data hidden in said NFC and RPM tags using the combination of the display unit and the vibration motor.

According to one embodiment, the hand-held electronic peek device of present invention further includes an on-board orientation sensor to detect the change in orientation of connected small electronic device; an on-board motion sensor to detect movement of the coupled small electronic device; and an on-board video receiver to stream live video image received from plurality of hidden cameras.

According to one embodiment, the control unit is further programmed to receive a communication and data from the smart device of the user, such as smartphones or any other smart device, and display said data in the form of text or video message. According to present embodiment, the device is capable of being coupled with any third party software or mobile applications that may obtain the information from spectators, wherein the third party applications may be any of the simulated search engine, calculator, e-commerce sites or any other simulated fake application and/or software installed within the smart device of any of the spectator that monitors real-time functioning or information of the spectator and transmits said information to the electronic peek device to display.

According to one embodiment, the hand-held smart peek device of present invention communicates with the simulated or fake applications installed within the smart devices of the spectator that further provides inter net connectivity allowing the present electronic peek device to receive notification from web-based or smartphone applications.

According to one embodiment, the hand-held electronic peek device of present invention further receives and displays or notifies information from myriad of software applications such as, but not limited to, a simulated search engines, that enables the performer to identify the search term that has been made by the spectator on their device; a simulated web sites and e-commerce sites, that enables the performer to identify the search term that has been entered by the spectator on their device; a simulated calculators, that enables the performer to obtain numerically decoded information such as dates (including birthday), phone numbers, time, house, lotto numbers, ZIP Postal Codes, from these fields, additional data may be obtained such as birthday, star signs, suburb, state and city etc.; a simulated smartphone lock screens, that enables the performer to obtain numerically decoded information such as dates (including birthday), phone numbers, time, house, lotto numbers, ZIP Postal Codes, from these fields, additional data may be obtained such a birthday, star signs, suburb, state and city etc.; a software impression pads that communicate the image being drawn by the spectator and the image being displayed in real time on the display unit of the electronic peek device; a voice recognition with automatic voice to text conversion; and an electronic book tests, whereby the word in a book is displayed on the display unit.

According to present embodiment, the hand-held electronic peek device of present invention further includes a plurality of on-board control buttons configured within the main body of the device to allow user to select and control notification being received and being displayed over the display unit of the electronic peek device. Moreover, the device of present invention further includes a battery module to provide power to operate all the electronics of the electronic unit and a charging port to allow user to charge said battery module.

Figure 1:
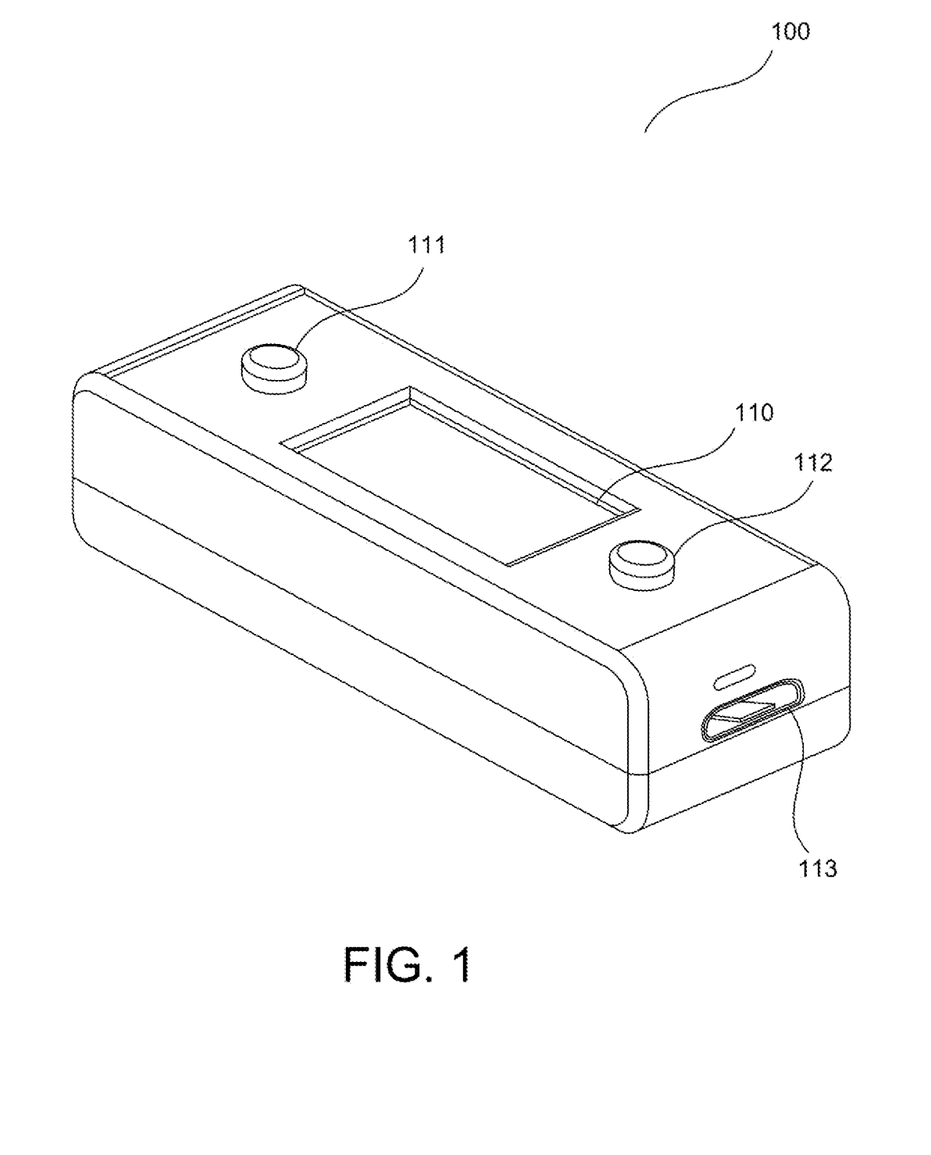
FIG. 1 illustrates an isometric view of the Notifier device.

In one embodiment, FIG. 1 describes an isometric view of the hand-held electronic peek device 100 of present invention, which is comprising of a miniaturized main body having an embedded LCD screen 110, left button 111, right button 112 and charging port 113. In another embodiment, the hand-held electronic peek device includes a high-resolution dot matrix LCD screen 110, which enables information to be communicated to the performer in real-time, which is gathered from a myriad electronic devices. Based on the information displayed on the LCD screen 110, the performer may use the information to divine information such as the device selected by the user, the location, of the device, the orientation of the device, the color of the device, the presence or absence of a magnetic field in proximity of the device, the timing of selection of the device and order of the selection of the device.

According to present embodiment, the buttons 111 and 112 are provided to manually scroll the events received and queued over the display unit of the electronic peek device. According to one embodiment, the device 100 further provides automatic functioning in which it automatically scroll to the next event after a designated time period, which is useful if the performance requires a hands free performance—for example, if the hand-held device 100 is hidden in the top pocket of the performer. According to one embodiment, the hand-held electronic peek device 100 is further capable to override messages, so new messages override older messages which is beneficial when the old information is no longer relevant.

Figure 2:
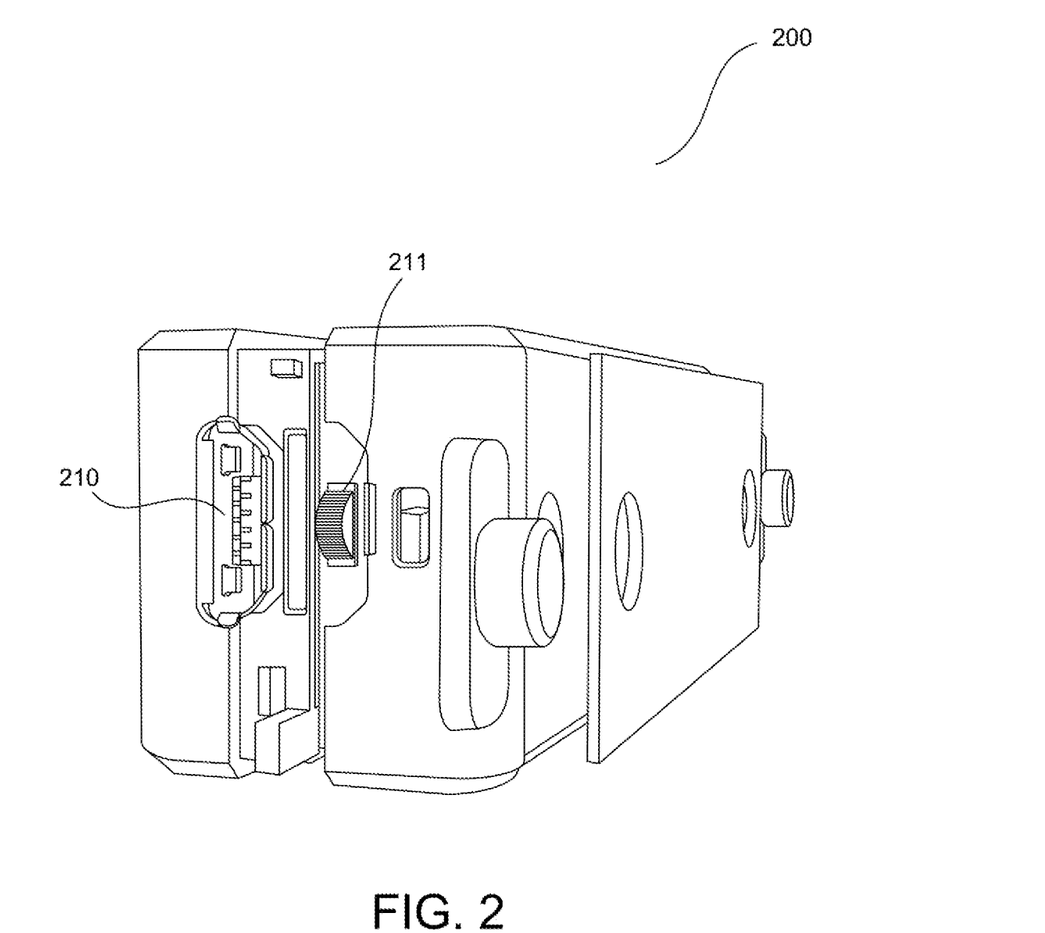
FIG. 2 illustrates an exploded view of the Notifier device showing all the components.

In one embodiment, FIG. 2 illustrates the exploded view of the hand-held electronic peek device. According to present embodiment, the electronic peek device 200 of present invention is comprising of a charging port 210 to charge the battery module of the device. According to one embodiment, the electronic peek device of present invention further includes a notification LED 211 that turns on when the device is being charged.

Figure 3:
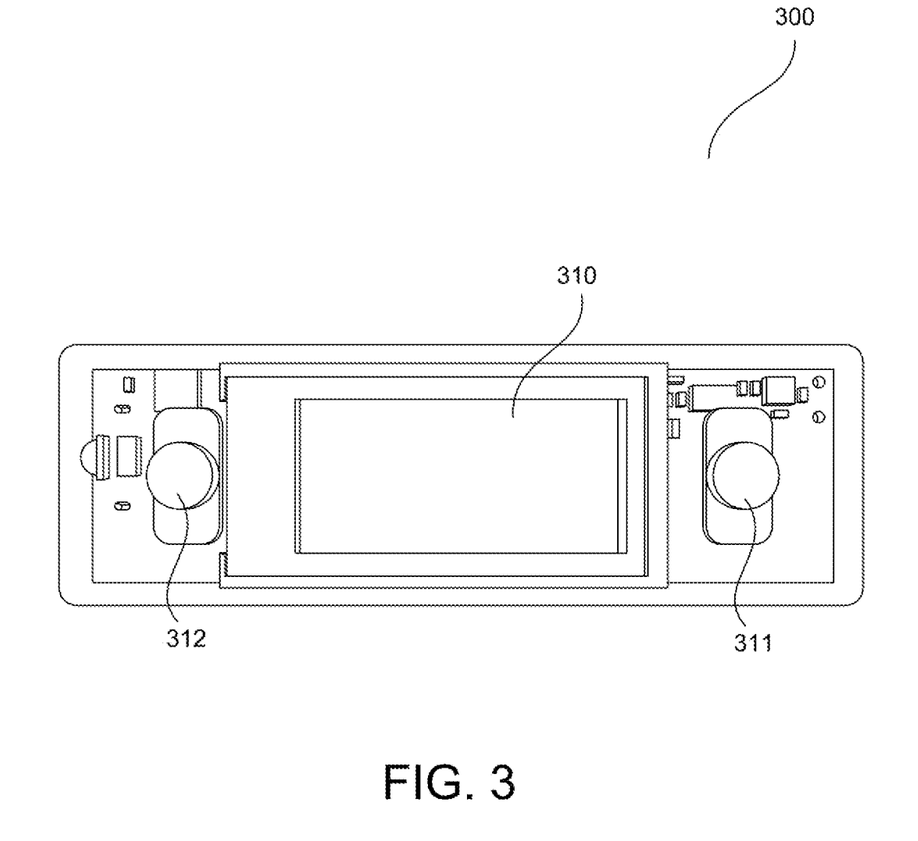
FIG. 3 illustrates the front view of the Notifier device showing components.

In one embodiment, FIG. 3 illustrates a front view of hand-held electronic peek device 300. The device 300 includes the LCD screen 310, left button 311 and right button 312. In one embodiment of the invention, the high resolution LCD screen 310 receives information from a myriad of electronic devices, including but not limited to electronic dice with an inbuilt radio transmitter electronic Dominoes with an inbuilt radio transmitter, electronic poker chips with an inbuilt radio transmitter, electronic pens with an inbuilt radio transmitter, electronic crayon box holder with an inbuilt radio transmitter, electronic Rubik's cubes, with an inbuilt radio transmitter, RFID/NFC Readers which includes both external and onboards Smartphone-based NFC Readers, magnetic field sensors, motion sensors, electronic impression pads.

In another embodiment, the electronic peek device 300 has the ability to display the order of playing card from a shuffled deck on the high resolution LCD screen 310, through the use of an IR camera which is placed on the device 300 that scans the barcode embossed on the edges of the playing cards. The device 300 has the ability to display which cards are missing from a deck of playing cards on LCD screen 310 while conducting real-time performance. In another embodiment, the Notifier device 300 also has the ability to display which cards have been inserted into a deck of playing cards. In another embodiment device 300 has an ability to analyze the metrics of a cut deck which includes but is not limited to number of cards, number of cards of a nominated suit and many more.

Figure 4:
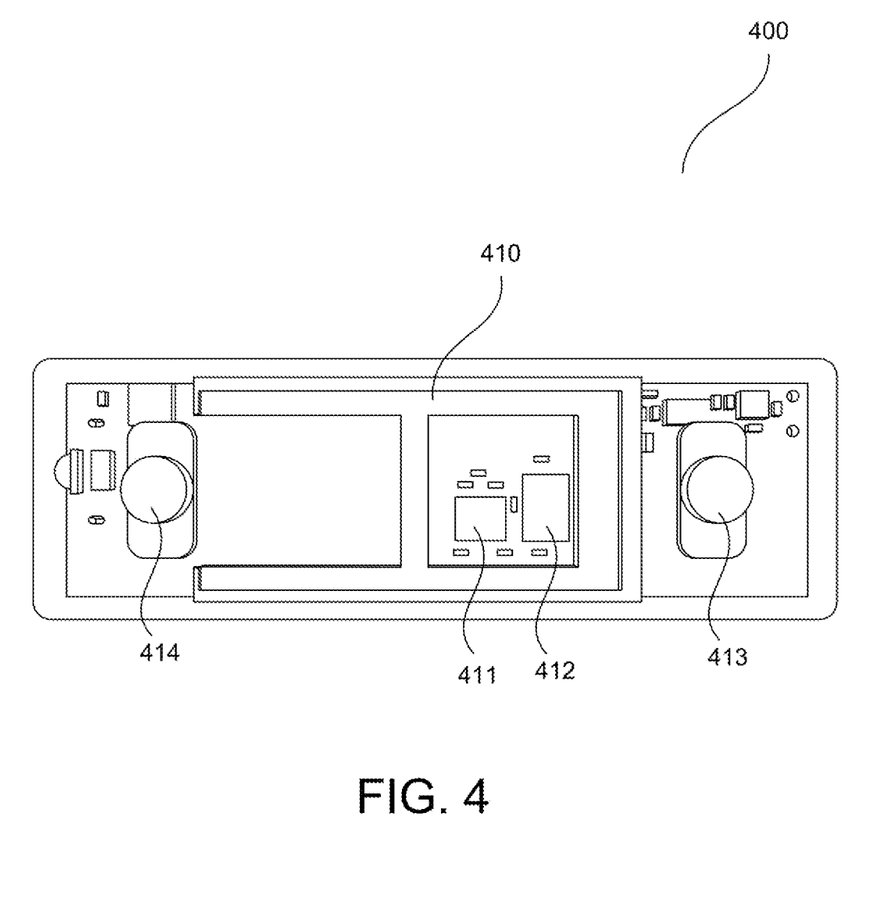
FIG. 4 illustrates the front view of the Notifier device without the screen, showing the circuit unit.

In one embodiment, FIG. 4 is a front view of the device without the LCD screen, showing the electronic unit 400. The electronic unit 400 has a frame 410 to house the LCD screen. In one embodiment, the unit 500 also has a Bluetooth radio transceiver 411, radio receiver, and vibrator motor 412. In one embodiment, the inbuilt vibrator 412 communicates the selected colour, orientation, polarity, card value and card suit. In another embodiment of the invention, the electronic unit 400 further comprises multiple radio receivers 415 that enable simultaneous processing of data being received from myriad of other small electronic devices.

Figure 5:
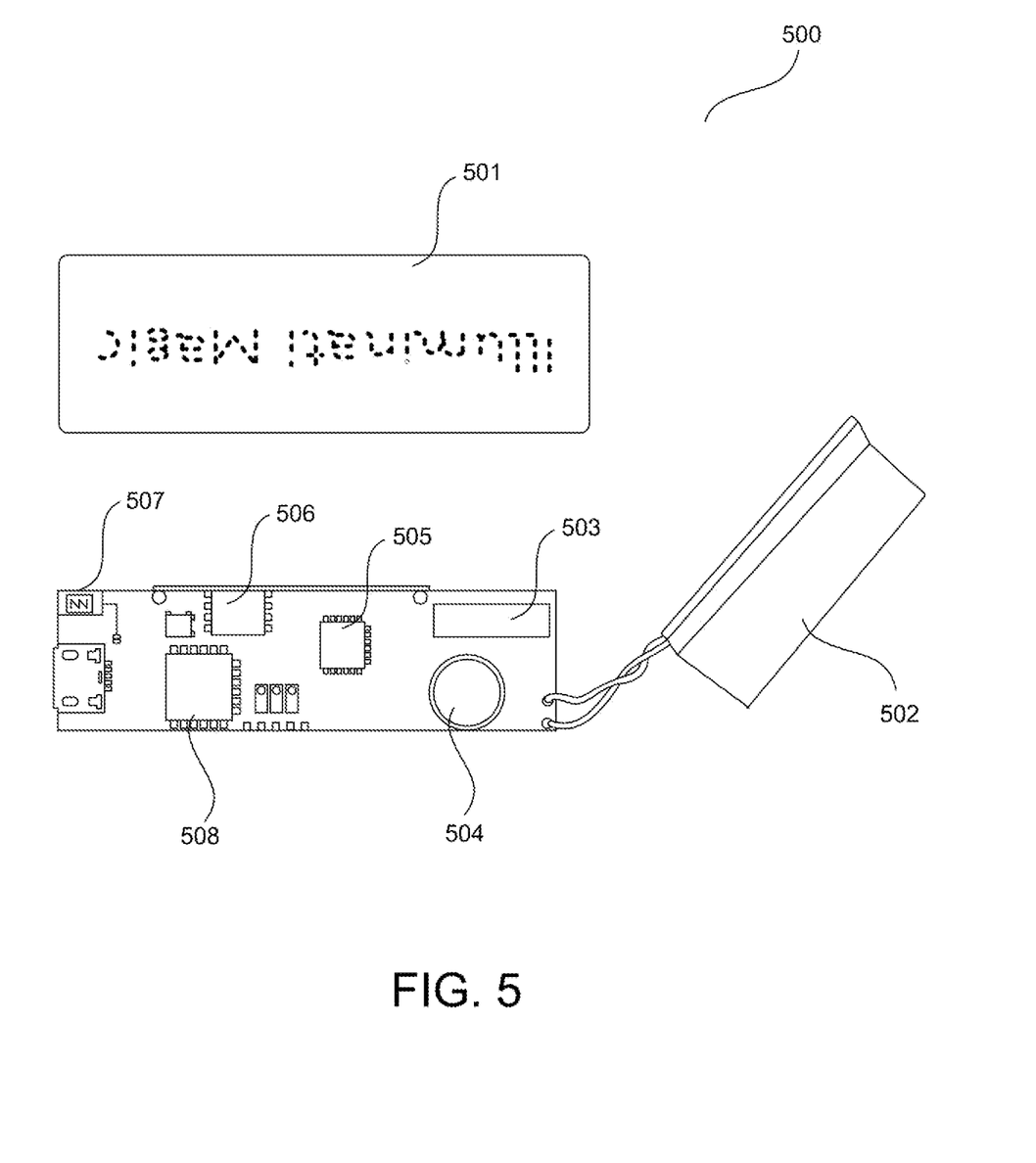
FIG. 5 illustrates the back view of the printed circuit board of the Notifier.

In one embodiment, FIG. 5 describes the back view of the printed circuit board 500 of the Notifier Device. The components include radio receiver 503, Bluetooth transceiver 504, Non Volatile Memory 505, Main CPU 507 vibrate motor 508, magnetometer 506 and battery 502. These components are protected by the outer cover 501 of the Notifier Device. According to one embodiment, the Notifier Device transcodes radio signals received by the radio receiver 503 and then converts these radio signals into Bluetooth signals which are then communicated to Smartphones. According to another embodiment, once the Smartphone has received the message in Bluetooth, the information can be displayed on the Smartphone, on the Smartwatches like Apple Watch, and can also be played via spy earpiece for text to speech.

According to one embodiment, the control unit of the electronic unit along with the normal vibration function such as vibration of x number of time to indicate the value of the dice roll, includes several other embodiments or combination of vibration signals to communicate different colours and/or orientations. According to present embodiment, the electronic unit of present invention, to communicate the colour of the dice in addition to the result of the dice roll, vibrates the vibration motor first to communicate the colour followed by the result. For example, a 1 vibrate indicates white, 2 vibrates indicates black and 3 vibrates indicates red. Thus, 3 vibrates, followed by 5 vibrates would indicate a red dice with a result of 5. One vibrate, followed by 2 vibrates, would indicate a white dice with a result of 2.

According to one another embodiment, to communicate the selected playing cards from the deck of 52 cards, the device of present invention adopts two vibrate sequences, the first vibrate sequences represents the suit (1=Clubs, 2=Hearts, 3=Spades, 4=Diamonds) and the second vibrate sequence represents the value (Ace, 2,3,4,5,6,7,8,9,10, Jack, Queen and King). As the counting of up to 13 vibrate signals would get time consuming and prone to error, the electronic peek device of present invention incorporates a vibrate pattern of a short vibrate representing the value of 1 and a long vibrate representing a value of 5. Inn this method a value of 12 would be represented by 2×Long vibrates (2×5) plus 2×short vibrates (2×1).

In one more embodiment, the electronic unit further includes a magnetic field detector, a NFC/RFID reader, orientation sensors, board motion sensors and video receiver to stream live video images that can be used to obtain information from the hidden cameras. In another embodiment, these components are configured to receive radio signals from different electronic magic props items such as electronic dice, dominoes, poker chips, pens, crayons, cubes, motion sensors, movement sensors, magnet detectors and RFID/NFC Readers.

In one embodiment, an example of electronic device such as the poker chip is provided. The Poker chips have an inbuilt radio transmitter that detection orientation, movement and magnetic fields. In another embodiment, external RFID/NFC readers placed on the Notifier device scans the radio transmitter of the poker chip and transmit the information to the circuit unit. The transmitted information is then processed the information and displays the information on the LCD screen for the performer. When the RFID/NFC reader scans information from multiple electronic devices, the transmitted information is processed and queued accordingly.

In another embodiment, Notifier receives information from myriad software applications, which includes simulated search engines that enables the performer to identify the search term that has been made the spectator on their device, simulated web sites and e-commerce sites that enable the performer to identify the search term that has been entered by the spectator on their device, simulated calculators that enables the performer to obtain numerically decoded information such as dates (including birthday), phone numbers, time, house, lotto numbers, ZIP/Postal Codes. In one embodiment, the Notifier can also receive information from simulated smartphone lock screens that enable the performer to obtain numerically decoded information such as dates (including birthday), phone numbers, time, house, lotto numbers, ZIP/postal codes. In another embodiment, software and electronic impression pads communicate the image being drawn by the spectator and the image being displayed in real-time on the Notifier display. In one embodiment, from the above information, the performer can collect additional data such as a birthday, star signs, suburb, state and city.

In another embodiment, the Notifier has the ability to recognize text and can automatically convert from text to voice. In electronic book tests the word in a book is displayed on the LCD screen of the Notifier device.

In another embodiment, the registered mode of the device ensures that the Notifier will only respond to the devices that are registered.

In another embodiment, the Notifier device simultaneously communicates with the Smartphone App, that provides inter net connectivity allowing the Performer to check the notifications received by the device from web-based applications.

The invention claimed is:

1. A hand-held electronic peek device is comprising:
   a main body;
   an electronic unit configured within the main body, wherein the electronic unit is further comprising:
     a control unit;
     a plurality of radio transmitters configured to couple and communicate with a myriad of various electronic props;
     a memory unit communicatively coupled with the control unit; and
     an RFID/NFC reader configured to read RFID and NFC tags embedded within any of the myriad of various electronic props;
     a high-resolution dot matrix display communicatively coupled with the control unit to enable detailed information received from the myriad of various electronic props to be communicated to a magician or a performer in real-time;
     a vibration motor to communicate the detailed information received from the myriad of various electronic props using vibration; and
     an infrared camera to record and transmit a real time recording to be displayed over the high-resolution dot matrix display.

2. The hand-held electronic peek device of claim 1, wherein the myriad of various electronic props is any of from the group consisting of one or more electronic dice with an inbuilt radio transmitter, one or more electronic dominoes with an inbuilt radio transmitter, one or more electronic poker chips with an inbuilt radio transmitter, one or more electronic pens with an inbuilt radio transmitter, one or more electronic crayon box holders, one or more electronic Rubik cubes, an RFID or NFC readers including both an external and on-board smartphone based NFC readers, magnetic field sensors and one or more electronic impression pads.

3. The hand-held electronic peek device of claim 1, wherein the hand-held electronic peek device is capable to receive and display the detailed information of any order of playing cards from a shuffled deck of playing cards, a card which is missing from the deck of playing cards, the card which has been inserted into the deck of the playing cards, analyzed data of the metrics of a cut deck, orientation, movement, color, velocity, magnetic field presence, programmed tag information and denomination of any of the myriad of various electronic props.

4. The hand-held electronic peek device of claim 1 further includes a magnetic field sensor which is configured to detect magnets hidden in any of the myriad of various electronic props which is hidden by a spectator during a trick or performance.

5. The hand-held electronic peek device of claim 1 further includes an onboard orientation sensor to detect a change in orientation of any connected electronic devices from the myriad of various electronic props.

6. The hand-held electronic peek device of claim 1 further includes an electronic impression pad that communicates an image being drawn by a spectator and the said image is displayed in real-time on the high-resolution dot matrix display of the electronic peek device.

7. The hand-held electronic peek device of claim 1, wherein the control unit is further capable of being coupled with a plurality of remote cameras to monitor and transmit data to the magician.

8. The hand-held electronic peek device of claim 1, wherein a battery module is configured within the main body of the hand-held electronic peek device to supply power for working of the electronic unit.

9. The hand-held electronic peek device of claim 8, wherein a charging port is provided to recharge the battery module.

10. The hand-held electronic peek device of claim 1, wherein a plurality of buttons are provided to allow the magician or performer to select and view information and notifications being received over the high-resolution dot matrix display.

11. The hand-held electronic peek device of claim 1, wherein the control unit further receives and displays data from any simulated software or mobile application installed within a smart device of any one of a plurality of spectators.

12. The hand-held electronic peek device of claim 11, wherein the simulated software or mobile application may be any of, from the group consisting of, a simulated search engine, a calculator, an e-commerce site, a simulated smartphone lock screen, a software impression pad or any other simulated fake mobile application and software.

13. The hand-held electronic peek device of claim 11, wherein the control unit receives and displays data which includes information including numerically decoded information including birthdate, phone number, time, address, lotto numbers, zip or postal codes, star signs, suburbs, state and city.

* * * * *